Patented May 16, 1950

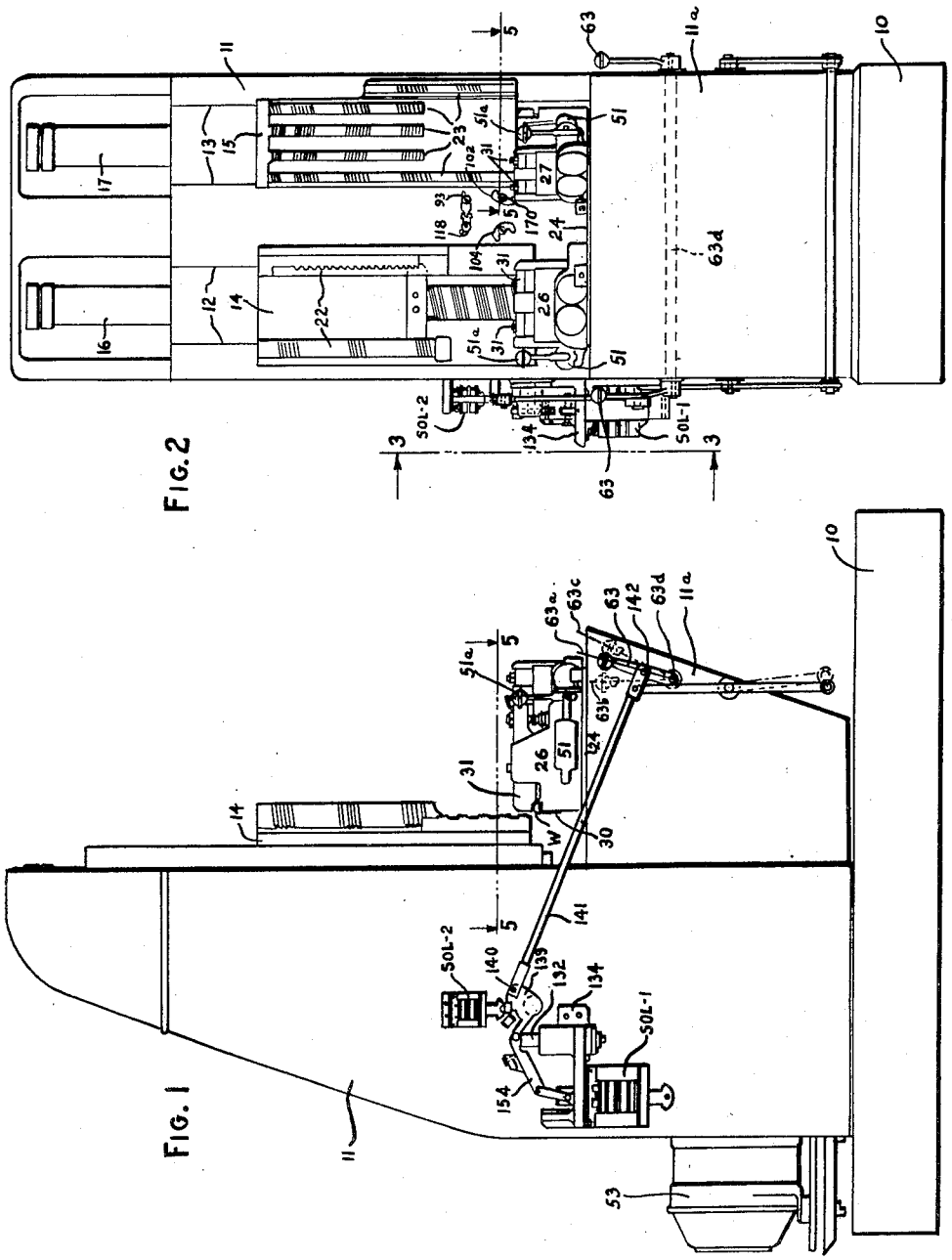

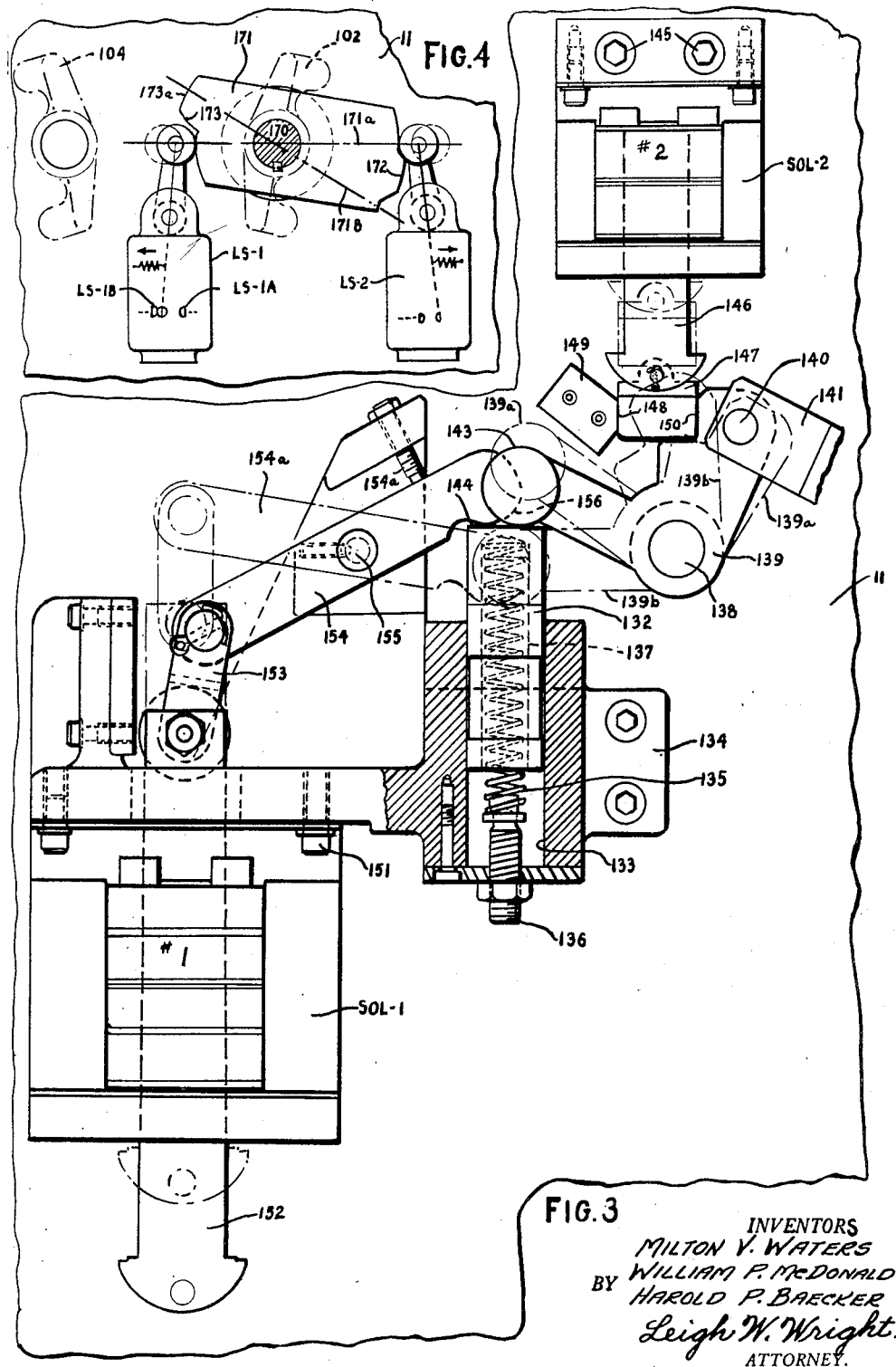

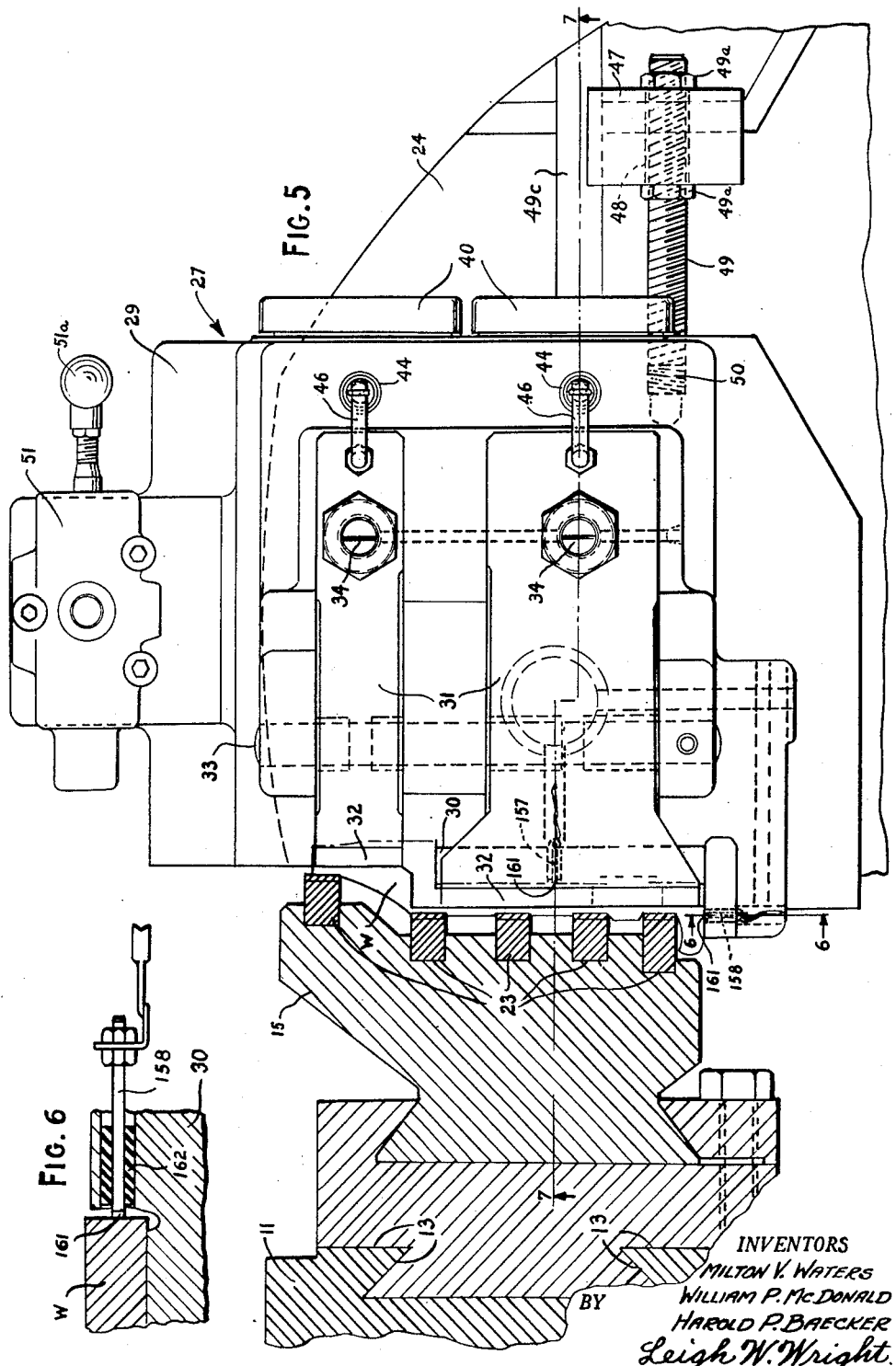

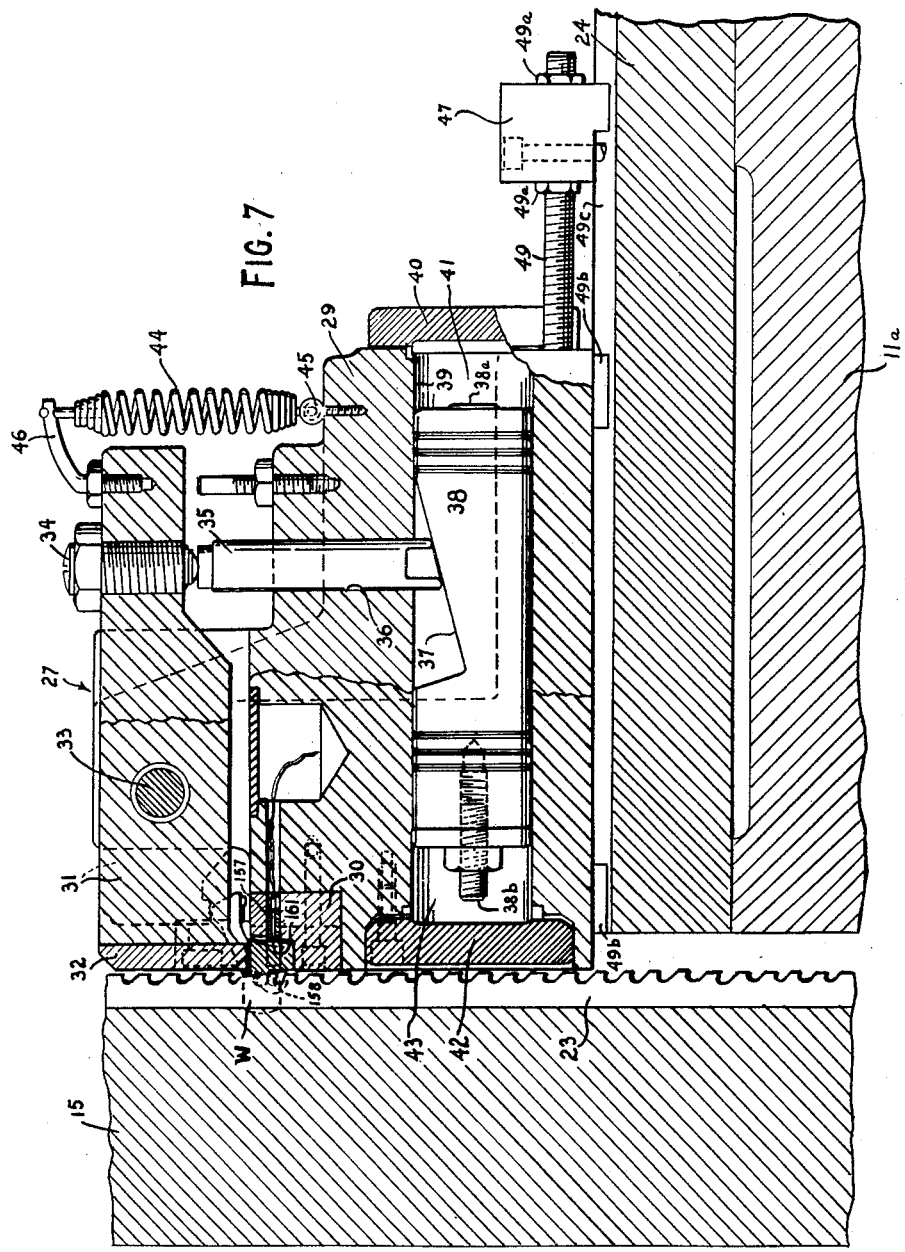

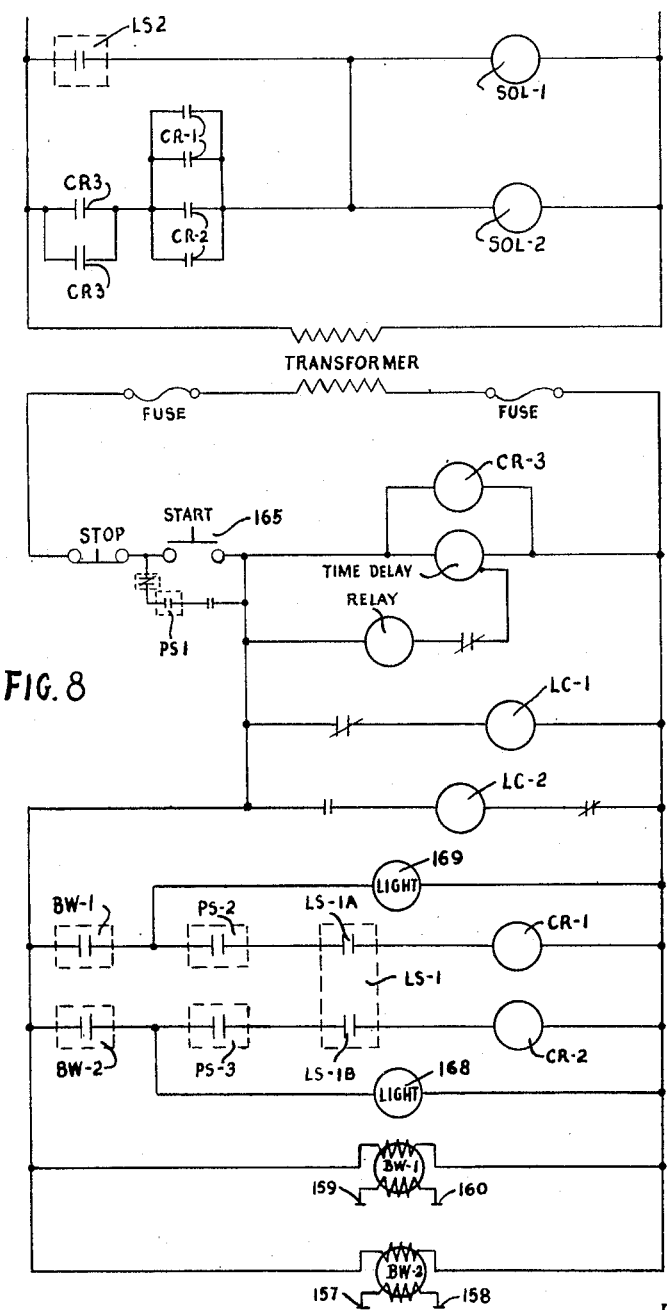

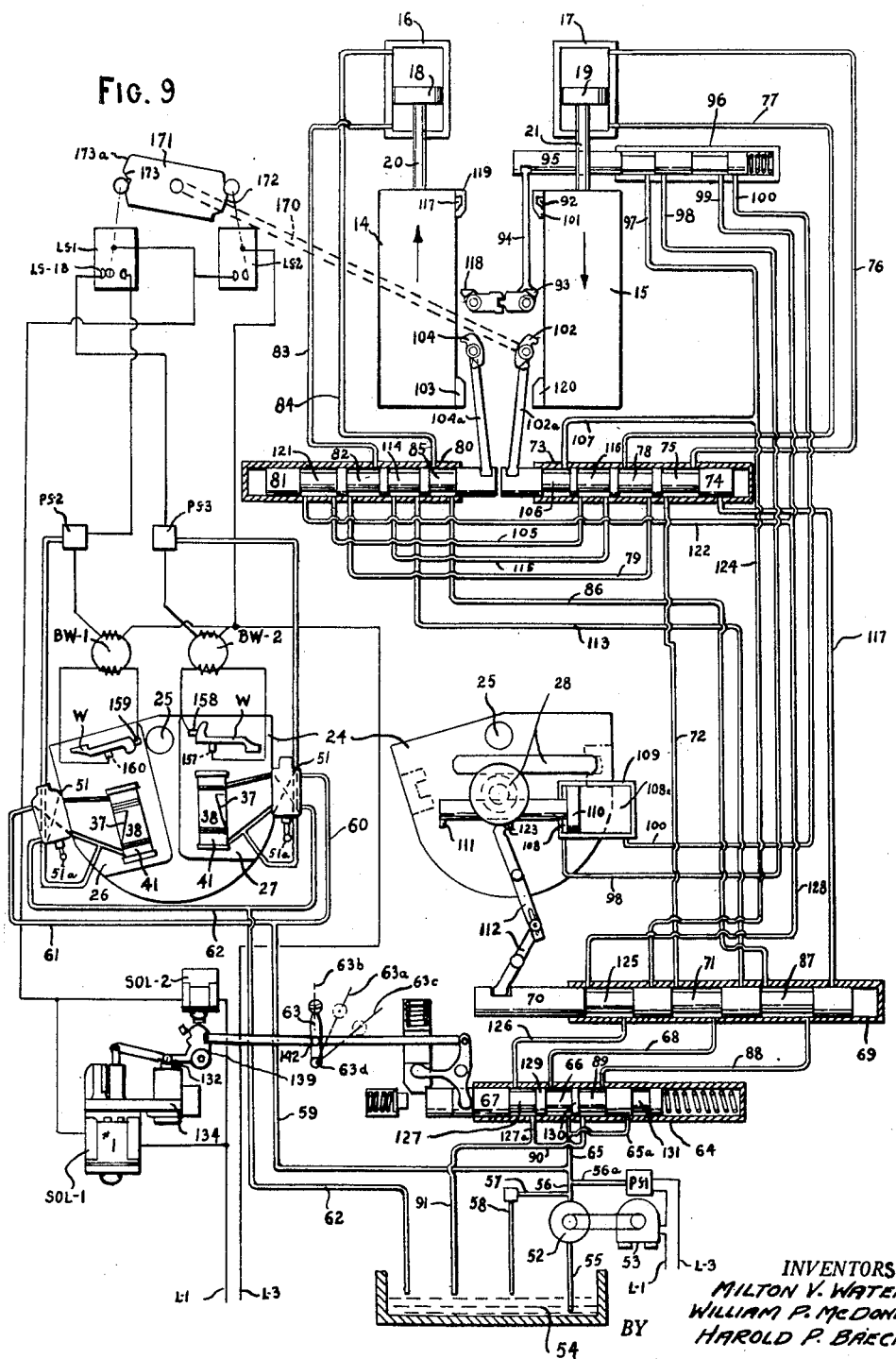

2,507,581

UNITED STATES PATENT OFFICE 2,507,581

SAFETY DEVICE FOR BROACHING MACHINES

Milton V. Waters, Silverton, William P. McDonald, Cincinnati, and Harold P. Baecker, Milford, Ohio, assignors to The Cincinnati Milling Machine Co., Cincinnati, Ohio, a corporation of Ohio Application February 26, 1945, Serial No. 579,800

9 Claims. (Cl. 90—33)

1

This invention relates to improvements in machine tools and more particularly to safety devices for protecting the operation of broaching machines.

One of the objects of this invention is to provide a machine tool with certain safety features which will reduce inadvertent operating action that might cause damage to the tool, the work, or any of the supporting members of the machine structure.

Another object is to provide improved means for the safe operation of a machine tool whereby inadvertent relative movements between the cutter, the work, and the fixtures for holding the work may be prevented.

A further object of this invention is the provision of an improved broaching machine of the multiple or duplex type for continuously producing work pieces which is safe to a maximum degree.

Still another object is to provide certain control interlocks whereby automatic stopping of the machine operation by a safety device causes automatic locking of the control levers of the machine so that they may not be operated to restart the machine until the cause of the operation of the safety device has been remedied.

And a still further object of this invention is to provide a broaching machine in which the work piece must be securely clamped in an accurate predetermined position in the work holder before the machine can be set in operation and which machine will automatically stop in the event the work piece moves out of said predetermined position during the clamping of the work in the work holder, or due to the shifting of the work in the work holder during the actual cutting operation, and to provide in the machine means to prevent restarting of the cutting operation until the work has been again properly located in correct predetermined position.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a left hand side elevation of a duplex

2 vertical broaching machine incorporating the features of this invention.

Figure 2 is a front elevational view of the duplex broaching machine shown in Figure 1.

Figure 3 is an enlarged fragmentary left hand side elevation of a portion of the left side of the machine showing the solenoid control mechanism for the main control levers of the machine indicated by the line 3—3 in Figure 2.

Figure 4 is an enlarged diagrammatic view of the control limit switches and associated operating cam for the solenoid control mechanism of Figure 3.

Figure 5 is a fragmentary plan view partly in section on the line 5—5 of Figures 1 and 2 showing the right hand work holder.

Figure 6 is a fragmentary enlarged section of one of the work contacting electrodes indicated by the line 6—6 in Figure 5.

Figure 7 is a vertical transverse section on the line 7—7 of Figure 5.

Figure 8 is an elementary electrical circuit diagram of the electric control mechanism of the machine.

Figure 9 is a diagram of the hydraulic and electric control mechanism for the broaching machine.

In a machine tool, particularly of the type of a surface broaching machine, it is customary to grip and hold a work piece in an appropriate work holder or fixture rigidly on the machine frame and to move an elongated broach or cutter over the work piece to machine finished surfaces on the work. It is frequently necessary to chuck or grip such work piece by means of its rough exterior surface with the result that it may not be gripped sufficiently firmly in the work fixture to prevent its possible readjustment or slipping in the fixture as it is being clamped and also as the broach passes over it during the cutting operation. Should the work not be properly positioned in the fixture or slip or move in the fixture during the cutting operation it is obvious that the surfaces machined will not be in proper position on the finished work piece when removed from the fixture. Also the operator may not accurately position the work piece in the fixture before clamping it and may even forget to properly clamp the work before starting the machining operation which obviously would result in a defective work piece and may even result in damage to the machine structure, the cutting tools, and the fixture in the event the work would move too far or become dislodged from the fixture.

This invention provides a foolproof arrangement which prevents the machine from operating unless the work is appropriately positioned and firmly held in the machine during the cutting operation. As an example of a machine incorporating such features there is illustrated a vertical duplex surface broaching machine, Figures 1 and 2, of a type shown in Patent 2,024,254, issued December 17, 1935, comprising a base 10 upon which is rigidly mounted an upright column 11 having formed integral therewith the work supporting knee portion 11a. On the column is formed suitable dovetail guideways 12 and 13, Figure 2, on which are mounted the vertically slidable broaching slides or rams 14 and 15 which may be actuated by means of suitable hydraulic motors comprising cylinders 16 and 17, Figure 9, having pistons 18 and 19 connected through piston rods 20 and 21 to the respective rams 14 and 15. On the rams 14 and 15 are mounted appropriate broaches or cutters 22 and 23 appropriately designed to meet the particular cutting operation to be performed on the work W.

On a pin 25 fixed in the knee 11a is pivotally mounted for oscillatory movement a work table 24. On this table 24 is mounted a pair of work holders or fixtures, indicated generally at 26 and 27, Figures 2 and 9, which may be alternately presented to working position with the respective broaching cutters 22 and 23 by oscillatory motion of the work table 24 by a suitable indexing mechanism indicated generally by the reference character 28, Figure 9. Each of the work fixtures 26 and 27 may be of any suitable design for rigidly gripping and holding the work piece W while being operated upon by the broaching cutters 22 or 23. The general arrangement of a broach machine for alternately presenting one or the other of the work holders to the respective broaches 22 and 23 is clearly set forth in the above-mentioned patent.

Referring particularly to Figures 5 and 7, each of the work holders may comprise a frame 29 which is mounted on the work table 24 and has a work supporting abutment block 30 rigidly fixed to it upon which rests the work piece W in proper position to be engaged by the broaches when the work table has moved the particular fixture into a cutting position. The work piece W is held firmly against the abutment block 30 by means of a pair of clamps 31 pivotally mounted on a suitable stud 33 carried in the frame 29 of the fixture and having work engaging blocks 32 fixed thereto. In the rearward end of each of the clamps 31 is provided an abutment screw 34 which engages a cam plunger 35 mounted for vertical sliding movement in a bore 36 formed in the frame 29 and engaging an angular cam surface 37 formed in the actuating piston 38 reciprocatably movable in the bore 39 formed in the frame 29 of the fixture. A cap 40 fixed to the frame 29 closes the cylinder 39 to form a chamber 41 for clamping of the work in the fixture when fluid pressure is applied in the chamber. A closure cap 42 attached rigidly to the fixture 29 and closing the other end of the bore 39 forms a chamber 43 for the application of fluid pressure to the piston 38 for retraction of the clamps 31 for releasing the work piece W from the fixtures. An abutment 38a on the piston 38 engages the cap 40 to limit its unclamping motion while an abutment screw 38b in the other end of the piston 38 engages the cap 42 to limit the clamping movement of the piston when no work W is in the fixture, and permits operation of pressure switches PS-2 or PS-3 for operation of the machine without work in the fixture. Suitable tension springs 44 interconnected between the eye-bolts 45 fixed in the frame 29 and a projecting pin 46 carried by the clamps 31 serve to assist in the rapid return of the clamps away from the work when the work fixture is unclamped. Suitable adjusting means comprising a block 47 fixed to the work table 24 and having a clearance bore 48 through which passes the adjusting screw 49 fixed in the threaded bore 50 of the frame 29 serves to provide means for bodily adjusting the fixture 29 guided by torques 49b formed on the bottom of each fixture which slide in the slot 49c formed in the table 24 relative to the broaching cutters 23 by appropriately adjusting the nuts 49a for accurately setting the depth of cut and compensating for changes in the size of the broach teeth after sharpening.

Fluid pressure to be applied in the chamber 41 for clamping and in the chamber 43 for unclamping the fixture is controlled by a suitable reversing control valve 51 having operating lever 51a mounted on each of the fixtures. Referring particularly to Figure 9, fluid pressure for operating the clamping pistons 38 for the fixtures is derived from any suitable source such as a fluid pressure pump 52 which may be driven by any suitable prime mover such as an electric motor 53 appropriately connected thereto and which pump 52 derives a supply of fluid from a reservoir 54 through a suction line 55 and discharges fluid under pressure through a line 56 which is also connected to a line 57 and a pressure relief valve 58 which maintains proper operating pressure in the pressure supply line 56. Fluid pressure from this line 56 is conveyed through a line 59 which is connected through lines 60 and 61 to both of the control valves 51 for each fixture. A suitable return line 62 is also connected to the control valves 51 for return of exhausted fluid to reservoir 54. Thus by manipulating either of the valves 51 the respective fixture may be caused to clamp or unclamp the work piece therein by reversibly connecting the line 60—61 and the drain line 62 to the respective chambers 41 or 43 of the clamping cylinders 39 of each fixture.

The actuation of the broaching rams 14 and 15 in opposite reciprocating motion and the movement of the table in indexing motion is accomplished by hydraulic actuating mechanism. The machine operation is controlled by means of the duplicate main operating control levers 63, Figures 1, 2, and 9. These control levers have three operative positions; an intermediate or stop position 63a, a start position 63b, and a reverse position 63c. These control levers are interconnected by rock shaft 63d journaled in the knee 11a and are appropriately connected to the main start, stop, and reversing control valve 64, Figure 9, which as shown, is positioned with the lever in the start position 63b with the machine operating and performing a cutting operation on the work piece in the right hand fixture. Under these conditions fluid pressure from the pressure supply line 56 passes through the line 65 through the annular groove 66 of the valve stem 67 of the valve 64 into a line 68 which is connected to the ram direction valve 69 having a plunger 70 which at this time is positioned so its annular groove 71 connects line 68 with line 72. The line 72, in turn, is connected to the right hand ram control valve 73 having a plunger 74 which at this time is positioned so its annular groove 75 connects line 72 to line 76 which, in turn, is connected to the upper chamber of the cylinder 17 for the ram 15. Thus, the piston 19 and ram 15 are moved downward in a cutting stroke and fluid is being displaced from the lower chamber of the cylinder 17 out through a line 77 to the valve 73 where it is connected through the annular groove 78 of the valve stem 74 to a line 79 which is connected to the left hand ram control valve 80 having a plunger 81 with its annular groove 82 so positioned at this time that the line 79 is connected to the line 83 which, in turn, is connected to the lower chamber of the cylinder 16 to thereby cause the piston 18 and its ram 14 to move upwardly to its initial starting position. Fluid discharged from the upper chamber of the cylinder 16 passes out through a line 84 to the valve 80 and then through the annular groove 85 of the valve stem 81 to the line 86 which is connected to the valve 69 and through the annular groove 87 of its valve stem 70 communicates with the line 88 which, in turn, is connected to the valve 64 and through the annular groove 89 in the valve stem 67 connects with the drain line 90 and 91 returning the exhausted fluid to the reservoir 54.

As the ram 15 reaches the end of its downward stroke a dog 92 engages the trip lever 93 having an appropriate arm 94 connected to operate the plunger 95 to momentarily open the indexing cut-off valve 96 so as to connect lines 97 and 98 and line 99 with line 100. Also a dog 101 at this same time engages the trip lever 102 while a dog 103 on the ram 14 engages the trip lever 104 when the ram 14 reaches its upward stroke to thereby shift the valve plunger 74 through the lever arm 102a to the right and the valve plunger 81 through the lever arm 104a to the left as shown in Figure 9. When thus shifted, fluid pressure in the line 72 is then connected through the annular groove 78 in valve plunger 74 to the line 79 and communicates through the annular groove 82 in valve plunger 81 with a line 105, which at this time is connected through the annular groove 106 in valve plunger 74 with the line 107 connected to the line 97 so that fluid pressure then passes through line 97, valve 96 to line 98 and to the chamber 108 of the indexing cylinder 109 for the table indexing mechanism 28, causing the piston 110 to move and index the work table 24 so as to present left hand fixture 26 in working position while withdrawing the right hand fixture 27 for unloading and reloading.

As the fixture 26 arrives at its new indexed position an appropriate dog 111 actuated by the movement of the piston 110 and operating through suitable linkage 112 moves the valve stem 70 of the ram reversing valve 69 to the right as shown in Figure 9. Fluid pressure from the line 68 then passes through the annular groove 71 of the valve stem 70 to the line 113 which is connected to the valve 80 and communicated at this time through the annular groove 85 with the line 84 connected to the top of the cylinder 16 to cause downward movement of the ram 14 in cutting stroke. Discharge from the lower end of the cylinder 16 passes out through the line 83 and through the annular groove 114 of valve stem 81 into a line 115 which communicates with the valve 73 and through an annular groove 116 in the valve stem 74 with the line 77 connected to the bottom of the cylinder 17 to cause upward withdrawal of the ram 15. At this time discharge from the upper end of the cylinder 17 passes out through the line 76 to the valve 73 and through the annular groove 75 of its stem 74 into the line 117 through the annular groove 87 in the valve plunger 70 of valve 69 to the line 88 and thus through the valve 64 to the drain line 90—91 to the reservoir 54.

As the ram 14 reaches its downward position and the ram 15 its upward position, a dog 117 on the ram 14 engages the trip lever 118 to again momentarily shift the valve 96 for connecting lines 97—98 and 99—100, while a dog 119 on the ram 14 engages the trip lever 104 while a trip dog 120 on the ram 15 engages the trip dog 102 to again reposition the valve plungers 81 and 74 as shown in Figure 9. At this time fluid pressure from the line 68 passes through the annular groove 71 of valve plunger 70 into line 113 to the valve 80 and then through the annular groove 114 in its stem 81 into the line 115 to the valve 73 where it communicates through the annular groove 116 of the plunger 74 with the line 105 which is connected to the valve 80 and through an annular groove 121 which communicates with a line 122 connected to the line 99 which, through the valve 96, is connected to the line 100 and then to the chamber 108a of the indexing cylinder 109 to thereby cause it to move to the left as seen in Figure 9 to again bring the right hand fixture into cutting position and withdraw the left hand fixture for unloading and loading. As the piston 110 of the indexing cylinder 109 thus moves to complete this indexing motion a dog 123 operated thereby and through the linkage 112 moves the valve 69 to the position shown in Figure 9 for a continuation of the cutting cycle for the right hand ram 15 and the withdrawal upward of the left hand ram 14 to its initial starting position. When the piston 110 in the table indexing cylinder 109 is moving to discharge fluid from the chamber 108, this fluid passes out through the line 98 through the valve 96 into the line 97 which has a branch line 124 connected to the valve 69 and by the appropriate position of the plunger 70 its annular groove 125 connects line 124 with the line 126 going to the valve 64 and which communicates through the annular groove 127 of the valve plunger 67 with the drain line 90 and 91 for return of fluid to the reservoir 54. When the piston 110 of the table indexing cylinder 109 is moving in the opposite direction fluid is discharged through the line 100 through the valve 96 to the line 99 which has a branch line 128 connected to the valve 69 and through the annular groove 125 in the valve plunger 70 communicates with the line 126 through the annular groove 127 in the valve stem 67 of valve 64 with the drain line 127a and 91 for return of fluid to the reservoir 54.

When the control lever 63 is in the stop position the spool 129 of the valve plunger 67 closes off the drain line 127a and the pressure line 65 is connected by the annular groove 89 to the drain line 90 so the machine is stopped or inoperative. When the control lever 63 is moved to the reverse position 63c the pressure line 65 is closed at the annular groove 89 while the branch line 65a is connected through the annular groove 131 of valve plunger 67 to the line 88 while the line 68 is now in communication through the annular groove 66 with the drain line 127a to thereby apply fluid pressure to the hydraulic system in the opposite direction for the reversal of the machine operation. The above described machine structure is fully set forth and described in the aforementioned Patent 2,024,254 to which reference may be had for a further detailed description of this apparatus.

This invention is directed to safety devices for controlling the above-mentioned apparatus so that the machine may be operated with the highest degree of safety by an inexperienced operator while effecting maximum accurate work output. More particularly, this invention is directed to safety control interlock mechanism for the control lever 63 whereby it may be automatically operated from start to stop position in accordance with the condition of the work piece in the respective work fixture presented in cutting position by the work table 24, this mechanism being so arranged that the lever 63 will be moved from the start position 63b to the stop position 63a and locked in said stop position in the event the work is not properly clamped or positioned in the particular work fixture during the clamping or actual cutting operation on the work piece. This mechanism is best shown in Figures 1, 3 and 9 and comprises a spring-operated plunger 132 slidably mounted in a suitable bore 133 in a bracket 134 fixed to the side of the column 11 and is normally urged upwardly, Figure 3, by a suitable compression spring 135 bearing against the abutment screw 136 carried by the bracket 134 and contained in a bore 137 formed in this plunger 132. On a suitable rock shaft 138 journaled in the column 11 is fixed a bell crank lever 139 having one arm connected by means of a pivot pin 140 to a connecting rod 141, Figure 1, which, in turn, is connected by a suitable pivot pin 142 to the control lever 63 so that the bell crank lever 139 may be rocked by movement of the control lever 63 to its three operative positions. The other end of the bell crank lever 139 has a rounded end portion 143 engaging the outward abutment surface 144 of the spring-urged plunger 132 so that when the control lever is in the stop position, as shown in Figure 1, the rounded end portion 143 of the bell crank lever 139 rests upon surface 144 of the plunger 132 which is in its uppermost position at this time with the compression spring 135 fully extended. It will also be noted that the control lever 63 may be moved into the reverse position at any time, since so moving the lever 63 simply moves the bell crank lever to the position 139a lifting the rounded end portion 143 away from the surface 144 of the plunger 132.

Associated with the bell crank lever 139 is a latching or locking solenoid SOL-2 appropriately mounted by suitable screws 145 on the column 11 and having an armature 146, Figure 3, upon the end of which is carried a latching block 147 which engages an abutment surface 148 of a block 149 fixed to the column 11 and engages an abutment surface 150 formed on the bell crank lever 139. Normally when the control lever 63 is in a stop position and the solenoid SOL-2 de-energized the block 147 will be dropped between the abutment surfaces 148 and 150, as shown in Figure 3, to prevent the moving of the control lever 63 from the stop or the reverse position to the start position 63b. When the solenoid SOL-2 is energized, however, its armature 146 is drawn upwardly to withdraw the block 147 and permit the control lever to be moved into the start position.

With the block 147 operated by solenoid SOL-2 withdrawn, it is necessary to depress the spring plunger 132 before the control lever 63 can be moved into the start position 63b and this is accomplished by means of the plunger operating solenoid SOL-1 mounted by suitable screws 151 on the bracket 134 having an armature 152 connected through an appropriate link 153 to lever arm 154 pivoted on a suitable stud 155 in the bracket 134 and having a rounded end portion 156 engaging the abutment surface 134 on the plunger 132. When the solenoid SOL-1 is de-energized, as shown in Figure 3, the plunger 132 is allowed to move upwardly bringing the lever arm 154 against the stop screw 154a in the bracket 134 to force the control lever 63 from the start position 63b into the stop position 63a as shown. When, however, the solenoid SOL-1 is energized it moves to the position with the lever arm 154 in the position 154a and thereby depresses the plunger 132 and permits the bell crank lever 139 to be moved manually to the position 139b which permits the control lever 63 to be moved into the start position. Thus, so long as both the solenoids SOL-1 and SOL-2 are energized the control lever may readily be manually moved from the stop or reverse positions to the start position. However, when both of the solenoids are deenergized the spring punger 142 will automatically trip the lever 63 back to the stop position and the deenergized solenoid SOL-2 will drop the latching block 147 in place to prevent the operator from moving the control lever into the start position.

Referring to Figures 5 and 6, both of the solenoids SOL-1 and SOL-2 are controlled by the condition of the work piece in the fixtures and this mechanism comprises a pair of contacts or electrodes 157 and 158 in the right hand fixture and 159 and 160 in the left hand fixture, Figure 9. Each of these electrodes is constructed as shown in Figure 6 and has a hardened tip 161 which contacts the work piece W and which is mounted on resilient insulative bushings 162 carried in the work abutment blocks 130 in the fixture frame 29. Thus, when the work W is firmly clamped on the abutment block 30 by the clamps 31 of the fixtures the work will be firmly held against the contact points 161 of the various electrodes and will slightly move the electrodes axially inwardly against the resilient mounting bushing 162 so that a certain minimum amount of relative movement of the work and the abutment blocks in the fixture within prescribed limits may take place before contact is broken between the electrodes and the work W.

The right hand fixture has a control relay BW-2 having one end of its operating coil connected to the electrode 157 and the other end of its operating coil connected to the other electrode 158 providing an electrical circuit comprising the operating coil, electrode 157, the work piece, and electrode 158 back to the operating coil of the relay BW-2. Thus, whenever the work piece W in the right hand fixture is not in contact with both of the electrodes 157 and 158 the aforementioned relay control circuit will be broken and the relay will be deenergized to disconnect its associated control switch. Similarly, the left hand fixture has a relay BW-1 connected serially with the associated electrodes 159, 160, and the work piece W in the left hand fixture whereby the work piece, when not in contact with both of the electrodes 159 and 160, will similarly deenergize the relay BW-1 and cause its associated control switch to be disconnected. This arrangement is generally shown diagrammatically in Figure 9 in which are shown the two current supply lines L-1 and L-3 for effecting the operation of the solenoids SOL-1 and SOL-2.

Also, associated with each fixture is provided a pressure switch control arrangement comprising a pressure switch PS-2 for the left hand fixture and a pressure switch PS-3 for the right hand fixture. Each of these respective pressure switches is connected serially with the switches of the corresponding control relays BW-1 and BW-2, above described, and are so arranged that so long as pressure is being applied in the clamping chamber 141 of the clamping cylinders 39 of the respective fixture in working position, its respective pressure switch PS-2 or PS-3 will be operative to connect the control circuit properly to a pair of control limit switches LS-1 and LS-2, indicated in Figures 4 and 9.

The sequence of operation of the machine with particular reference to the electrically operated safety control mechanism is as follows: In order to start the machine the operator first presses the start button 165, Figure 8, which energizes line contactor LC-1, and after a time delay, is deenergized to close line contactor LC-1 to run motor through line contactor LC-2 in a conventional manner. As soon as the prime mover or main drive motor 53, Figure 9, gains sufficient speed to drive the fluid pressure pump 52, pressure builds up in the supply line 56 to operate the pressure switch PS-1 through line 56a to thus maintain the connection initially established by pressing the start button 165. The motor 53 then continues to operate and the fluid pressure pump continuously delivers the fluid pressure supply through the line 56 for operating the machine.

The machine is now conditioned for loading a work piece in a fixture. In this particular duplex type of surface broaching machine one fixture is unloaded and loaded while the other fixture is in working position with the broach moving downward to machine the work piece. Assuming the left fixture is empty and the cutting operation is taking place on work in the right hand fixture, a work piece is placed in the empty fixture 26 so as to properly contact the electrodes 159 and 160 to complete the circuit through the relay BW-1 which thus energizes this relay and causes an indicating light 169 to light up, indicating the work piece has been properly and accurately positioned in the fixture. A similar indicating light 168 is provided for the right hand fixture. The control valve 51 for effecting hydraulic clamping of the work in the left hand fixture 26 is then operated and when the work is gripped the pressure switch PS-2 will operate to close its switch and if the work is still in proper engagement with the electrodes 159 and 160 after the application of the clamp to the work piece, the light 169 will continue to burn indicating that the work is still correctly positioned in the work fixture.

As the downward cutting stroke of the right hand ram 15 comes to an end a dog 101 on the ram 15 engages the trip lever 102 carried on a rock shaft 170 journaled in the column 11 which carries a control cam 171 shown in detail in Figure 4. This cam is in the position indicated by the horizontal line 171a during the downward cutting stroke of the ram 15, but is moved to bring the line 171b to the horizontal position when the reverse operation of the ram 15 and the downward cutting stroke of the ram 14 is taking place. As the ram 15 thus actuates the trip lever 102 at the end of its downward cutting stroke the raised cam portion 172 of the cam 171 operates a limit switch LS-2 which, through appropriate electrical control means maintains solenoids SOL-1 and SOL-2. energized. As the cam continues to rotate under the influence of the dog 101 on the ram 15, portion LS-1B of limit switch LS-1 will be closed and portion LS-1A opened by the portion 173 of the cam 171 to deenergize and open control relay CR-2, but the solenoids SOL-1 and SOL-2 stay energized as the cam 171 rotates through the actuation of the limit switch LS-2 by the high point 172 of the cam. Continued rotation of the rock shaft 170 and the cam 171 toward the position 171b causes portion 173a of the cam to ultimately close portion LS-1A of limit switch LS-1 and energizes control relay CR-1 which closes to also energize solenoid SOL-1 and solenoid SOL-2 in parallel with the limit switch LS-2. Further rotation of the cam 171 again opens the limit switch LS-2 as it rides off of the high point 172 leaving the control of solenoid SOL-1 and SOL-2 under control relay CR-1.

The cam finally finishes its rotation and portion LS-1A of limit switch LS-1 remains closed to keep control relay CR-1 energized so that the fixture which has the work loaded on it will then be in control of solenoid SOL-1 and SOL-2 for operating the control lever 139 and the latching block 147 for the control lever 63. Under these conditions, if the work is properly located in the fixture 26 in contact with the electrodes 159 and 160 and properly clamped by the hydraulic clamping device operated by its valve 51, the main control lever 63 may be manually moved to the forward or start position which initiates the index of the table and the reverse direction of operation of the broaching rams. If the control lever 63 cannot be moved from the stop position to the start position and the indicating light 169 is burning, this indicates the work has not been clamped or gripped in the fixture because solenoid SOL-1 and SOL-2 would be deenergized holding the lever 63 latched in the stop position.

It will be noted that the limit switch LS-1 has the operating portions LS-1a and LS-1b so arranged as to selectively render effective the particular work engaging electrodes and pressure switch associated with that fixture which is moved into cutting position while rendering the other fixture in loading and unloading position ineffective so far as the safety control mechanism is concerned. This two-position arrangement of the limit switch LS-1 automatically renders the respective fixture effective to control the safety operating mechanism when moved into cutting position. Thus, as the broaching ram 15 reaches the other end of its stroke, its dog 120 engages the trip lever 102 to cause the cam 171 to move in the opposite direction to the position 171a, thereby repositioning limit switch LS-2 to effect contact of its portion LS-1B and disconnect its portion LS-1A to render the other work fixture effective for controlling the solenoids SOL-1 and SOL-2 as it moves in to cutting position for the downward movement of the ram 14. The limit switch LS-2 is rendered effective to maintain solenoids SOL-1 and SOL-2 energized during transfer of control by the limit switch LS-1 so that the lever 63 remains in the start position 63b for continuous automatic operation of the machine so long as the operator keeps the work fixtures properly loaded and clamped up prior to the indexing of each work holder to working position. If the operator does not keep up with the machine cycle, the fixture in the loading and unloading which has not been loaded will cause the machine to stop when safety control is transferred to it by limit switch LS-1 as the end of the cutting stroke on the other fixture is reached, thus preventing the work table 24 from indexing the unloaded work fixture into cutting position. The operator may, of course, stop the machining cycle at any time in order to catch up with the loading and unloading of the work therein by manually moving the control lever 63 from the start to stop position.

If during the cutting operation of the broaches on the work piece W in the fixture the work should move beyond a prescribed tolerance determined by the limits of deflection of the resilient bushings 162 of the electrodes 157, 158, 159 and 160, one or the other of the relays BW-1 or BW-2 controlling its respective bushing will become deenergized. Either control relay CR-1 or control relay CR-2 will then become deenergized and the deenergized solenoid SOL-1 will thus throw the control lever 63 automatically to the stop position and solenoid SOL-2 will also be deenergized and drop the interference block 147 into position to prevent the operator from again restarting the machine by throwing the control lever from the stop position to the start position without first correcting the positioning of the work in the fixture. At any time during the operation of the machine, the main control lever 63 may be thrown into the reverse position to rapidly withdraw the broaches in the opposite direction in the event of accident or when it is desired to inspect the work and tools before finishing a cutting stroke.

There has thus been provided a safety device for the operation of a machine tool having a relatively movable work holder and cutting tool in which the movement of the work piece from a predetermined prescribed accurate position in the work holder causes the machine to cease operating. There has also been provided in such a safety device for a machine tool an arrangement in the work holder of the machine tool for utilizing the work piece as a conducting member to complete an electrical circuit in a control apparatus to prevent operation of the machine in the event the work piece is not properly positioned in the work holder or should the work move in the work holder during the actual cutting operation to automatically stop the operation of the machine until the work has again been properly positioned. In conjunction with such safety control apparatus there is also provided a safety interlock in connection with the clamping of the work in the work holders in proper engagement with the electric contact safety apparatus so that the work must be properly rigidly held in the fixture before the machine can function.

What is claimed is:

1. In a machine tool having cutting tools, and a pair of work holders alternately presentable in working position to said cutting tools, a prime mover for effecting relative movement of said tools and work holders, an electric control device in each of said work holders responsive to the position and clamped condition of a work piece in each work holder, a selector switch serially connected in an electric control circuit with said electric control devices operable by the presentation of one or the other of said work holders to working position for rendering the electric control device effective in the work holder presented to working position, and a third electric control device connected in said circuit in parallel with said electric control devices in the work holders, operable during the presentation of one or the other of said work holders to cutting position to render the control devices in both work holders momentarily ineffective to control the operation of said prime mover.

2. In a machine tool having cutting tool means, and a pair of work holders alternately presentable in cutting position relative to said cutting tool means, and power means for effecting relative feeding movement of said cutting tool means and work holders, a pair of electrical control devices in each work holder connected in parallel in a control circuit for rendering said power means operative or inoperative dependent upon the location and clamping of a work piece in each work holder, a selector switch serially connected in said circuit and with said electric control devices in the work holder for selectively rendering the control devices in the work holder presented to cutting position effective to control said power means, and a third electric control device connected in said circuit in parallel with said control devices in the work holders and said selector switch adapted to momentarily shunt out said devices and switch during a change in direction of relative movement of said cutting tool means and work holders.

3. In a duplex broaching machine, a frame, a pair of oppositely reciprocatable broaching rams on said frame, a reciprocatable work table on said frame, a pair of work holders for positioning and clamping work on said work table, fluid pressure means for actuating said rams and for moving said work table to alternately present one or the other of said work holders in working position with respect to said rams, a main source of fluid pressure for actuating said rams and work table, a main control valve operable to a stop, start and reverse position, and a control lever for actuating said main control valve, the combination of solenoid operated means effective when the solenoid is energized to release control lever for manual movement to any of its operative positions and shiftable when the solenoid is deenergized to move said control lever from said start position to the stop position and to limit the manual movement of said lever to said stop and reverse positions, an electrical control mechanism associated with each work holder and means to selectively render said control means in a particular work holder operated when the holder is presented to cutting position to energize or deenergize said solenoid operating mechanism in accordance with the position of the work piece in the work holder.

4. In a machine tool, a pair of oppositely reciprocating tools, a movable work holder for alternately presenting work fixtures carried thereby to the tools, a prime mover for reciprocating said tools and moving said work holder, a power actuated device for rendering said prime mover inoperative to reciprocate said tools and move said work holder, a pair of electric control circuits connected in parallel through said fixtures, a trip operated control means actuable by the movement of said tools to effect reversal of the movement of the tools and work holder, electric control means actuated by said trip operated control means to connect one or the other of said electric control circuits to said power actuated device, means in each of said fixtures serially connected in each of said electric circuits to break said circuits to render said power actuated device effective to arrest movement of said prime mover, and means actuable by said trip operated control means to cause said power actuated device to remain ineffective so as to maintain said prime mover operative while said electric control means connects one or the other of said electric control circuits to said power actuated device.

5. In a machine tool having tool holding means, work holding means alternatively presentable to the tool holding means, and means for effecting cyclic relative movement of said parts, an automatic safety stop mechanism for said cyclic movement including independent control circuits individual to the respective work holders for actuation of the stop mechanism, and cyclic means for alternately coupling the respective work holder circuits in controlling relation with the stop mechanism.

6. In a machine tool having tool holding means, work holding means alternatively presentable to the tool holding means, and means for effecting cyclic relative movement of said parts, an automatic safety stop mechanism for said cyclic movement including independent control circuits individual to the respective work holders for actuation of the stop mechanism, cyclic means for alternately coupling the respective work holder circuits in controlling relation with the stop mechanism, and additional means for rendering the stop mechanism inoperative during the changeover of control from one to another of the respective work holders.

7. A control mechanism for a machine tool having relatively movable tool and work holder elements, and a control device respectively shiftable into running, stop, and reverse positions, said control mechanism including a first element normally projectable into the path of movement of the controlled device for preventing its movement into starting position, a second control element normally reacting on the control device to force the same into stop position, said control device being retractable relative to said elements into a reversing position, a control circuit including solenoid means energizable to retract said elements and permit movement of the control device into a start position, said control circuit including spaced contact members carried by the work support in position to engage a work piece thereon, whereby the circuit may be completed by positioning of an electrical conducting work piece on the support in engagement with the contacts, substantially as and for the purpose described.

8. A control mechanism for a machine tool having relatively movable tool and work holder elements, and a control device respectively shiftable into running, stop, and reverse positions, said control mechanism including a first element normally projectable into the path of movement of the control device for preventing its movement into starting position, a second control element normally reacting on the control device to force the same into stop position, said control device being retractable relative to said elements into a reversing position, a control circuit including solenoid means energizable to retract said elements and permit movement of the control device into a start position, said work holder element including distinct work clamping portions, means for cyclically presenting one or the other of said work clamping portions in tooling relation to the tool holding element, control circuits individual to the respective work clamping portions for determining energization of the solenoids when a work piece is properly positioned as respects the work clamping portion, and means for cyclically coupling the one or the other of the work clamping portions in controlling relation with the solenoids during presentation of a clamped work piece to the tool element.

9. A control mechanism for a machine tool having relatively movable tool holding and work holder elements, and a control device respectively shiftable into running, stop, and reverse positions, said control mechanism including a first element normally projectable into the path of movement of the control device for preventing its movement into starting position, a second control element normally reacting on the control device to force the same into stop position, said control device being retractable relative to said elements into a reversing position, a control circuit including solenoid means energizable to retract said elements and permit movement of the control device into a start position, said work holder element including distinct work clamping portions, means for cyclically presenting one or the other of said work clamping portions in tooling relation to the tool holding element, control circuits individual to the respective work clamping portions for determining energization of the solenoids when a work piece is properly positioned as respects the work clamping portion, means for cyclically coupling the one or the other of the work clamping portions in controlling relation with the solenoids during presentation of a clamped work piece to the tool holding element, and additional means for effecting a timed effective maintenance of the solenoid circuits during the cycle changeover of the controlling relationship of the work clamping portions with respect thereto.

MILTON V. WATERS.
WILLIAM P. McDONALD.
HAROLD P. BAECKER.

REFERENCES CITED

The following references are of record in the file of this patent:

UNITED STATES PATENTS

| Number | Name | Date |
|---|---|---|
| 1,745,873 | Stolz | Feb. 4, 1930 |
| 1,835,591 | Bullard | Dec. 8, 1931 |
| 1,939,038 | Bower et al. | Dec. 12, 1933 |
| 1,979,478 | Leland | Nov. 6, 1934 |
| 2,017,865 | Morgan | Oct. 22, 1935 |
| 2,024,251 | Romaine | Dec. 17, 1935 |
| 2,024,254 | Romaine et al. | Dec. 17, 1935 |
| 2,083,312 | Brown et al. | June 8, 1937 |
| 2,183,430 | Monroe | Dec. 12, 1939 |